United States Patent
Byford et al.

(10) Patent No.: US 8,724,696 B2
(45) Date of Patent: May 13, 2014

(54) SYSTEM AND METHOD FOR TRANSMITTING VIDEO AND USER INTERFACE ELEMENTS

(75) Inventors: Dustin Michael Byford, Pacifica, CA (US); Anthony Cannon, Cupertino, CA (US); Philip Langdale, Daly City, CA (US)

(73) Assignee: VMware, Inc., Palo Alto, CA (US)

( * ) Notice: Subject to any disclaimer, the term of this patent is extended or adjusted under 35 U.S.C. 154(b) by 370 days.

(21) Appl. No.: 12/889,090

(22) Filed: Sep. 23, 2010

(65) Prior Publication Data

US 2012/0076197 A1    Mar. 29, 2012

(51) Int. Cl.
*H04N 7/12* (2006.01)

(52) U.S. Cl.
USPC ..................................... 375/240.01

(58) Field of Classification Search
USPC ......................................... 375/240
See application file for complete search history.

(56) References Cited

U.S. PATENT DOCUMENTS

| | | | |
|---|---|---|---|
| 8,204,271 B2* | 6/2012 | Kogure et al. ............... | 382/100 |
| 8,233,527 B2* | 7/2012 | Schmit et al. ................ | 375/240 |
| 8,255,957 B1* | 8/2012 | Mattox ........................ | 725/63 |
| 2001/0026586 A1* | 10/2001 | Katata et al. ............... | 375/240.1 |
| 2003/0043172 A1* | 3/2003 | Li et al. ....................... | 345/636 |
| 2004/0258148 A1* | 12/2004 | Kerbiriou et al. ......... | 375/240.01 |
| 2007/0097130 A1* | 5/2007 | Margulis ..................... | 345/501 |
| 2007/0118867 A1* | 5/2007 | Kim et al. ................... | 725/100 |
| 2008/0109809 A1* | 5/2008 | Morishita et al. ........... | 718/103 |
| 2009/0060032 A1* | 3/2009 | Schmit et al. ............ | 375/240.01 |
| 2009/0080855 A1* | 3/2009 | Senftner et al. ............... | 386/52 |
| 2009/0257591 A1* | 10/2009 | Mithal et al. ................. | 380/252 |
| 2009/0257738 A1* | 10/2009 | Park et al. .................... | 386/124 |
| 2010/0218222 A1* | 8/2010 | Kim et al. ..................... | 725/54 |
| 2011/0249757 A1* | 10/2011 | Newton et al. ........... | 375/240.25 |
| 2012/0069146 A1* | 3/2012 | Lee et al. ...................... | 348/43 |
| 2012/0173755 A1* | 7/2012 | Margulis ...................... | 709/231 |
| 2012/0311457 A1* | 12/2012 | O'Gorman ................... | 715/740 |

* cited by examiner

*Primary Examiner* — Joseph Ustaris
*Assistant Examiner* — Talha Nawaz

(57) ABSTRACT

A method for offloading decoding of encoded video data from a computer system executing a video player application playing the encoded video data to a remote display terminal still enables the video player application to overlay transparent or semi-transparent graphical elements, such elements, such as user interface controls, onto the video, despite not having access to decoded video data. A video decoding function call from the video player application is intercepted and replacement video data is provided to the video player application rather than a decoded version of the encoded video data. The video player application is thereby able to overlay graphical elements onto the replacement video data to create composite video from which the graphical elements are then able to be subsequently extracted and transmitted with the encoded video data to remote display terminal, which decodes the video data and overlays the graphical elements for display.

21 Claims, 6 Drawing Sheets

SYSTEM AND METHOD FOR TRANSMITTING VIDEO AND USER INTERFACE ELEMENTS

BACKGROUND

In network environments such as the Internet, video data is typically transmitted by a web server (or other server, such as a streaming server) upon request by a personal computer. The software component on the personal computer that often requests the video data is a video player (e.g., Adobe Flash Player, etc.) embedded in a web browser (e.g., Internet Explorer, etc.) and the web server typically transmits the video data to the video player in a known video encoding (compressed) format such as MPEG-4 or H.263. Once the video player receives the transmitted video data from the network, it decodes (e.g., decompresses) the video data for rendering on the display of the personal computer. Often, the video player leverages specialized graphics hardware on the personal computer such as a graphics processing unit (GPU) to accelerate the processing required to decode and render the video data on the display.

In many cases, to enhance a user's viewing experience, the video player additionally incorporates or "composites" a user interface (UI) of video player controls or other graphical elements as transparent or semi-transparent overlays on top of the rendered video frames from the received video data. The video player performs such compositing after decoding the received video data, for example, by utilizing "alpha blending" techniques to combine pixel values of the UI elements with pixel values of a frame of video data (e.g., upon their decoding) in order to construct final composite video frames for display.

With the rise of technologies such as server based computing (SBC) and virtual desktop infrastructure (VDI), organizations are able to replace the traditional personal computers described above with instances of desktops that are hosted on remote desktop servers (or virtual machines running thereon) in a datacenter. A thin client application installed on a user's end terminal (e.g., laptop, PC, thin client device, etc.) connects to a remote desktop server that transmits a graphical user interface (GUI) of an operating system session for rendering on the display of the end terminal. One approach to such a remote desktop server system is VMware View, in which each user desktop operating system (e.g., Windows) is implemented in a separate virtual machine hosted on a server residing in an organization's datacenter. A remote display protocol such as Remote Desktop Protocol (RDP) or PC-over-IP (PCoIP) is implemented within the thin client application on the user's end terminal as well as within the corresponding virtual machine running the user's desktop (e.g., as a service running in the operating system of the virtual machine, etc.) that enables the virtual machine to transmit the desktop's GUI display for rendering on the user's end terminal.

In such "desktop virtualization" environments, a video player playing a video, as previously discussed (e.g., Adobe Flash Player in a web browser), would be executing within a virtual machine hosted on a server in the organization's datacenter despite the video itself being ultimately displayed on the user's end terminal (i.e., the video data must be additionally transmitted via the remote display protocol to the user's end terminal). However, decoding of received encoded video data, as is typically performed by the video player, as well as the additional task of transmitting the decoded video data over the network from the virtual machine to the user's end terminal for display can consume significant network bandwidth and computing resources, which could have otherwise been allocated to other virtual machines in the datacenter generally. In order to alleviate such network and computing resource pressure on a datacenter server, the remote display protocol service running within a virtual machine may be configured to intercept the video player's requests (e.g., to the operating system and/or specialized graphics hardware of the server) to decompress and display video data and, in turn, transmit the still-encoded video data to the thin client application on the user's end terminal. Upon receipt of the still-encoded video data, the thin client application on the user's end terminal may be configured to decode the video data so that it can be rendered on the end terminal display. Furthermore, the end terminal may include its own GPU to assist the thin client application in decoding the received video data.

Although the foregoing technique alleviates pressure on the network and computing resources of the virtual machine by passing responsibility for decoding video data from the video player running in the virtual machine to the thin client application on the user's end terminal, it also prevents the video player from compositing transparent or semi-transparent UI elements into the video data, for example, by using alpha-blending techniques, since such alpha-blending requires the video player to have access to decoded video data.

SUMMARY

One or more embodiments on the invention alleviate pressure on the network and computing resources of a computer system running a video player application, such as a virtual machine instantiated on a server in a datacenter, by passing responsibility for decoding video data to be played by the video player application to a separate remote display, such as a thin client device configured to display the graphical user interface of the virtual machine. Such embodiments however, still allow transparent or semi-transparent graphical overlays, such as video player controls, to be overlaid by the video player onto the playing video (i.e., such overlaying requiring decoded video), even though the video is not decoded by the computer system running the video player application.

A method, according to an embodiment, offloads decoding of encoded video data from a computer system executing a video player application playing the encoded video data to a remote display terminal, wherein the video player application is configured to decode the encoded video data and composite a graphical overlay onto the decoded video data and wherein pixels of the graphical overlay comprise alpha transparency values The method comprises intercepting a video decoding function call from the video player application requesting graphics hardware assistance from the computer system to decode the encoded video data, providing replacement video data to the video player application rather than a decoded version of the encoded video data in response to the video decoding function call, receiving composite video data from the video player application, wherein the composite video data comprises the provided replacement video data and the graphical overlay, extracting the graphical overlay from the received composite video data by subtracting the replacement video data from the composite video data; and transmitting the encoded video data and the extracted graphical overlay to the remote display terminal, wherein the remote display terminal decodes the encoded video data and composites the graphical overlay onto the decoded video data to generate a final composite video data for display.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
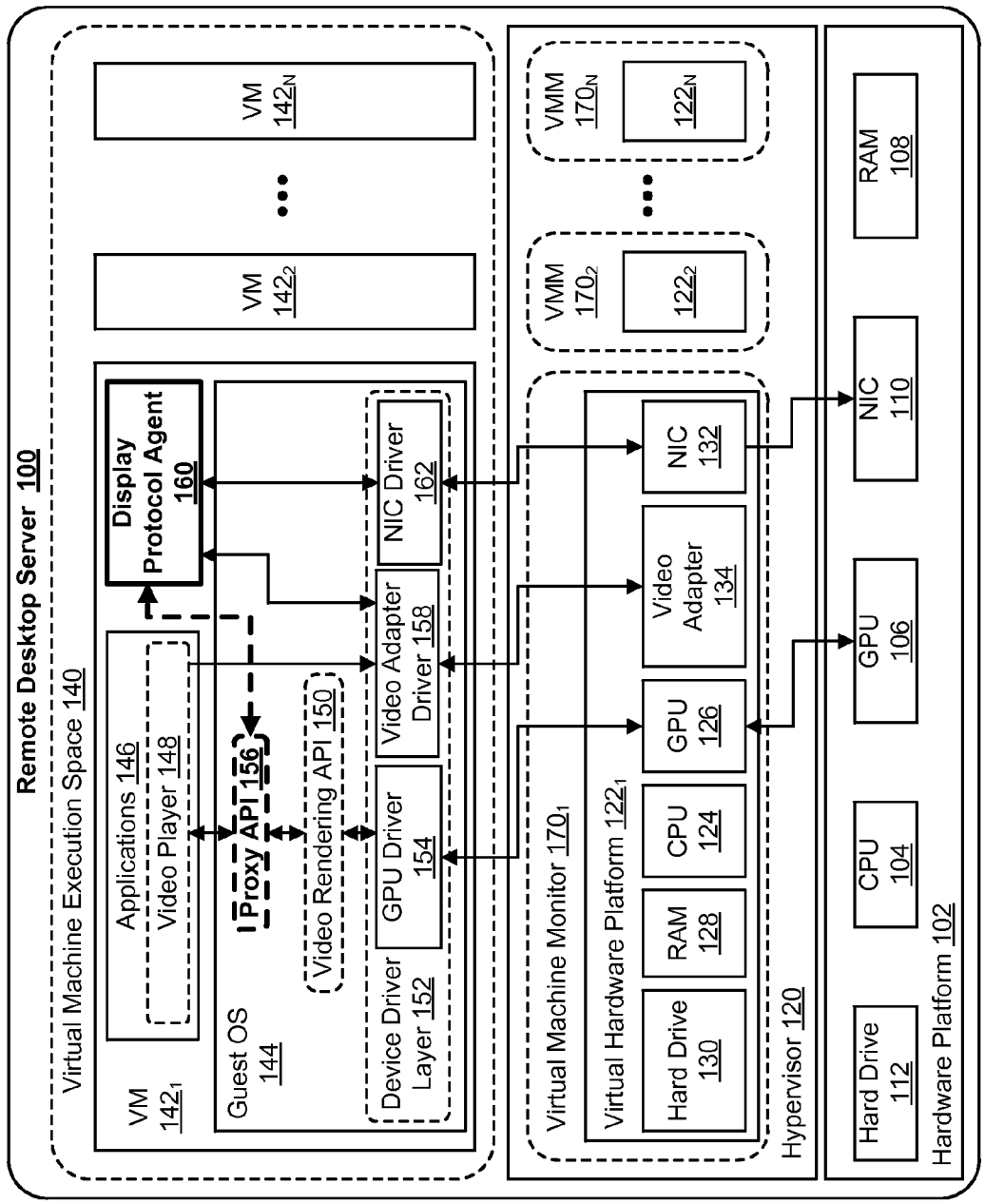
FIG. 1 depicts a block diagram of a remote desktop server.

FIG. 1 depicts a block diagram of a remote desktop server. Remote desktop server 100 may be, for example, constructed on a server grade hardware platform 102 such as an x86 architecture platform. Such a hardware platform may include CPU 104, GPU 106, RAM 108, network adapter (NIC 110), hard drive 112 and other I/O devices such as, for example and without limitation, a mouse and keyboard (not shown in FIG. 1). It should be recognized that hardware platform 102 is merely exemplary and that alternative hardware platforms may include additional or alternative hardware, such as, for example, multiple CPUs, multiple GPUs and the like.

A virtualization software layer, also referred to hereinafter as hypervisor 120, is installed on top of hardware platform 102. Hypervisor 120 supports virtual machine execution space 140 within which multiple virtual machines (VMs $142_1$-$142_N$) may be concurrently instantiated and executed. In one embodiment, each VM $142_1$-$142_N$ supports a desktop environment for a different user who is remotely connected from a user end terminal. For each of VMs $142_1$-$142_N$, hypervisor 120 manages a corresponding virtual hardware platform (i.e., virtual hardware platforms $122_1$-$122_N$) that includes emulated hardware implemented in software such as CPU 124, GPU 126, RAM 128, hard drive 130, NIC 132 and video adapter 134 (also sometimes generally referred to herein as "virtual" devices).

Virtual hardware platform $122_1$ may function as an equivalent of a standard x86 hardware architecture such that any x86 supported operating system, e.g., Microsoft Windows, Linux, Solaris x86, NetWare, FreeBSD, etc., may be installed as guest operating system (OS) 144 to execute applications 146 for an instantiated virtual machine, e.g., VM $142_1$. Applications 146 that require rendering video on a display, such as video player 148 (e.g., Adobe Flash Player in a web browser), request graphics hardware assistance to decode encoded video data (e.g., H.263, MPEG-4, etc.) through a video rendering application programming interface (API) 150 (e.g., Microsoft DirectX Video Acceleration, Windows Media Foundation, DirectShow, etc.) which, in turn, leverages virtual GPU 126 (and ultimately physical GPU 106) via communications with GPU driver 154 in device driver layer 152 to decode the video data. For example, video rendering API 150 may be implemented as a dynamically linked library provided as a component of guest OS 144. In the embodiment of FIG. 1, an additional proxy video rendering API 156 (hereinafter referred to as proxy API 156) is additionally installed or otherwise provided in guest OS 144 (e.g., again as a dynamically linked library, in one embodiment) to intercept calls made by video player 148 to video rendering API 150 and assess whether to forward such calls to video rendering API 150 or take alternative action as further discussed herein. It should be recognized, however, that use of a proxy API 156 as depicted in FIG. 1 to perform certain actions described herein is merely exemplary and that alternative embodiments may utilize alternative techniques to provide the functionality of proxy API 156. For example, in one alternative embodiment, video rendering API 150 may itself be modified, extended, configured or otherwise re-implemented to provide the functionality of proxy API 156. Yet another alternative embodiment may utilize a special binary interception library to intercept function calls from video player 148 and perform the functionality of proxy API 156 (e.g., Microsoft Detours, etc.). Other embodiments may incorporate the functionality of proxy API 156 in the device driver layer 152, in a modified version of GPU driver 154 or in any other appropriate device driver. Another embodiment may alternatively incorporate the functionality of proxy API 156 into the virtual device level, such as in virtual GPU 126. Yet other embodiments may incorporate the functionality of proxy API 156 into a functional component or "plug-in" to video player 148 that is supported by video rendering API 150. For example, Windows Media Foundation and DirectShow support such plug-ins to video players.

Upon receiving decoded video data back from video rendering API 150 (or proxy API 156, as the case may be), in certain embodiments, video player 148 further composites a transparent or semi-transparent UI interface (e.g., video player controls, other graphical elements, etc.) on top of the decoded video data by, for example, utilizing alpha blending techniques to combine pixel values of the UI interface with the received decoded pixel values of the video data and then transmits the composite video data to a video adapter driver 158 in device driver layer 152 for rendering on a display. Device driver layer 152 further includes additional device drivers such as NIC driver 160 that interacts with virtual devices in virtual hardware platform $122_1$ (e.g., virtual NIC 132, etc.) as if such virtual devices were the actual physical devices of hardware platform 102. Hypervisor 120 is generally responsible for taking requests from device drivers in device driver layer 152 that are received by virtual devices in virtual platform $122_1$, and translating the requests into corresponding requests for real device drivers in a physical device driver layer of hypervisor 120 that communicates with real devices in hardware platform 102. For example, if an actual physical display (e.g., monitor) is coupled to remote desktop server 100, the composite video data transmitted by video player 148 to video adapter driver 158 would be further transmitted to virtual video adapter 134 which would further facilitate transmission of the video data to a physical video adapter in hardware platform 102 that interacts with the monitor to render the video.

In the embodiment of FIG. 1, however, rather than utilizing a locally coupled physical display, the video data (as well as display data for the entire graphical user interface of guest OS 144) is transmitted to a display of a remote user end terminal by a display protocol agent 160 (e.g., running as a service in guest OS 144, in one embodiment). One example of such a display protocol agent is View Agent, a component of the VMware View VDI solution offered by VMware, Inc. of Palo Alto Calif. (VMware). In one embodiment, display protocol agent 160 interacts with video adapter driver 154 (e.g., through an API) to obtain video data (and desktop GUI displays) and subsequently transmits such data onto the network through NIC driver 162 (e.g., through virtual NIC 132 and, ultimately, through physical NIC 110) to the remote user end terminal. It should be recognized that in alternative embodiments, display protocol agent 160 may obtain video data (and desktop GUI displays) using alternative techniques other than interacting with video adapter driver 154. For example, in an alternative embodiment, display protocol agent 160 may include a proxy library component (similar to proxy API 156) that intercepts calls from video player 148 (and any other components in VM $142_1$ that generate graphics for display) to video adapter driver 154 or may otherwise intercept and obtain such display data utilizing other techniques similar to those previously described as alternatives for proxy API 156 (e.g. re-implemented video adapter driver, video player plug-ins, special binary interception library, etc.).

Those with ordinary skill in the art will recognize that the various terms, layers and categorizations used to describe the virtualization components in FIG. 1 may be referred to differently without departing from their functionality or the spirit of the invention. For example, virtual hardware platforms $122_1$-$122_N$ may be considered to be part of virtual machine monitors (VMM) $170_1$-$170_N$ which implement the virtual system support needed to coordinate operations between hypervisor 120 and corresponding VMs $142_1$-$142_N$. Alternatively, virtual hardware platforms $122_1$-$122_N$ may also be considered to be separate from VMMs $170_1$-$170_N$, and VMMs $170_1$-$170_N$ may be considered to be separate from hypervisor 120. One example of hypervisor 120 that may be used in an embodiment is VMware vSphere Hypervisor which is included as a component of VMware's vSpheres solution, commercially available from VMware. It should further be recognized that embodiments may be practiced in other virtualized computer systems, such as, for example, hosted virtual machine systems, where the hypervisor is implemented on top of an operating system (e.g., VMware Workstation, etc.).

Figure 2:
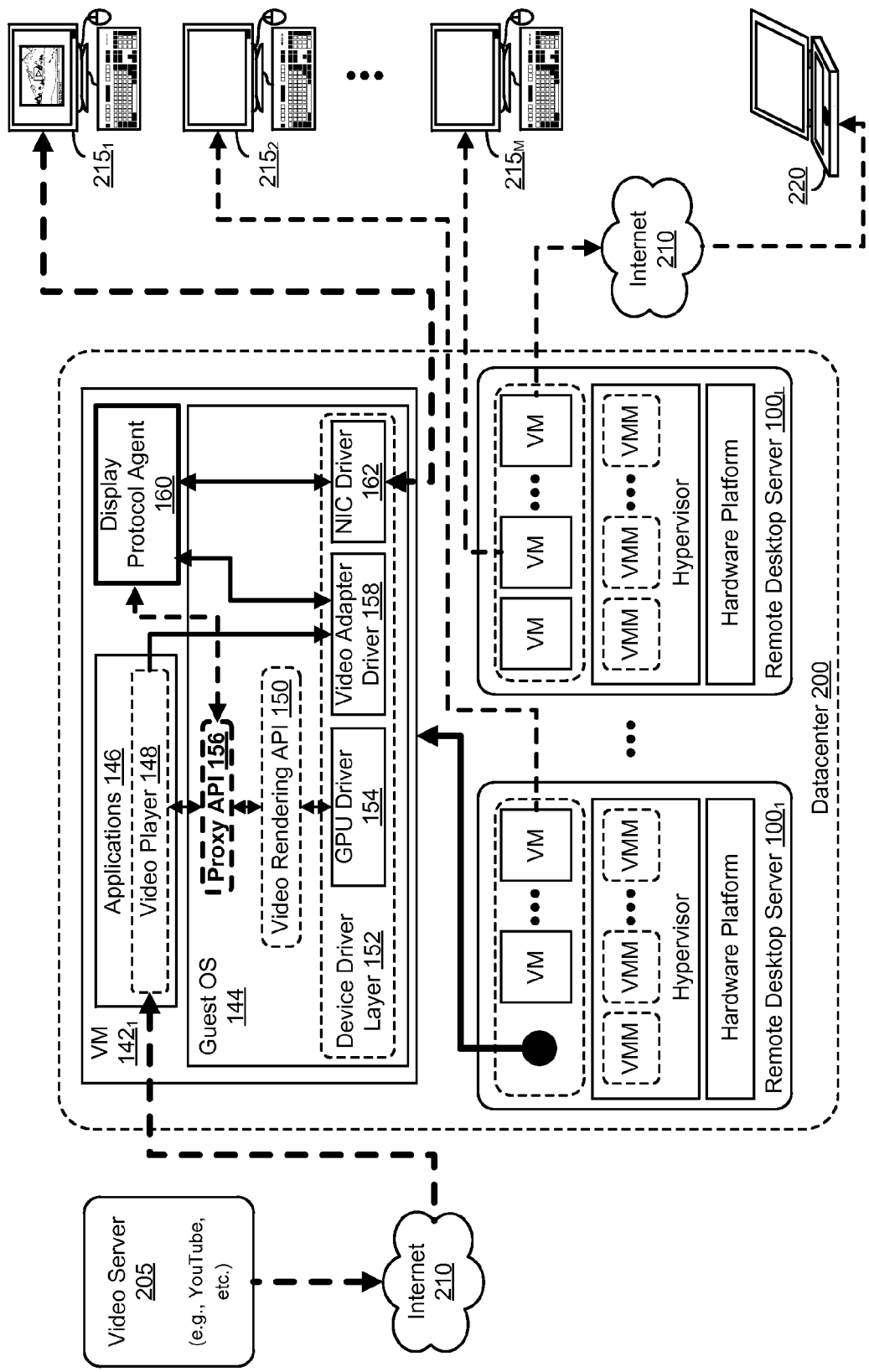
FIG. 2 depicts a block diagram of a remote desktop server network architecture supporting the rendering of video on a remote user end terminal.

FIG. 2 depicts a block diagram of a remote desktop server network architecture supporting the rendering of video on a remote user end terminal. VM $142_1$ as described in FIG. 1 is instantiated on remote desktop server $100_1$ in an organization's datacenter 200. Video player 148 (e.g., Adobe Flash Player embedded in a web browser), running in VM $142_1$, requests a video from a video server 205, which may reside across a network such as Internet 210. In one embodiment, video server 205 may be a web server such as YouTube or any other server that may, for example, stream the video (e.g., in encoded form) to video player 148 via a streaming protocol or provide for progressive downloading of the video to video player 148 thereby enabling the video to be played on video player 148 prior to downloading the entire video file. Video received by video player 148 from video server 205 is ultimately transmitted to a user end terminal $215_1$ for rendering. User end terminals may be, for example, thin client devices residing within the organization, such as end terminals $215_1$-$215_M$, personal computers such as laptop 220 that connect to the organization's datacenter 200 through the Internet 210, or any other computer system including a display (e.g., workstation, tablet computer, netbook, personal digital assistant (PDA), mobile device, game console, media playback unit, and any other computing device) and adequate network access (e.g., LAN access, WAN access, cellular network, Wi-Fi, Wi-Max, etc.). In one embodiment, each such user end terminal includes an installed thin client application that comprises functionality to decode encoded video data (such as MPEG-4, H.263, etc.) as well as perform image compositing techniques, such as alpha blending. Additionally, user end terminals may further include graphics rendering hardware, such as a GPU, to assist in the foregoing to accelerate the rendering of such video on the display of the user end terminal.

Figure 3:
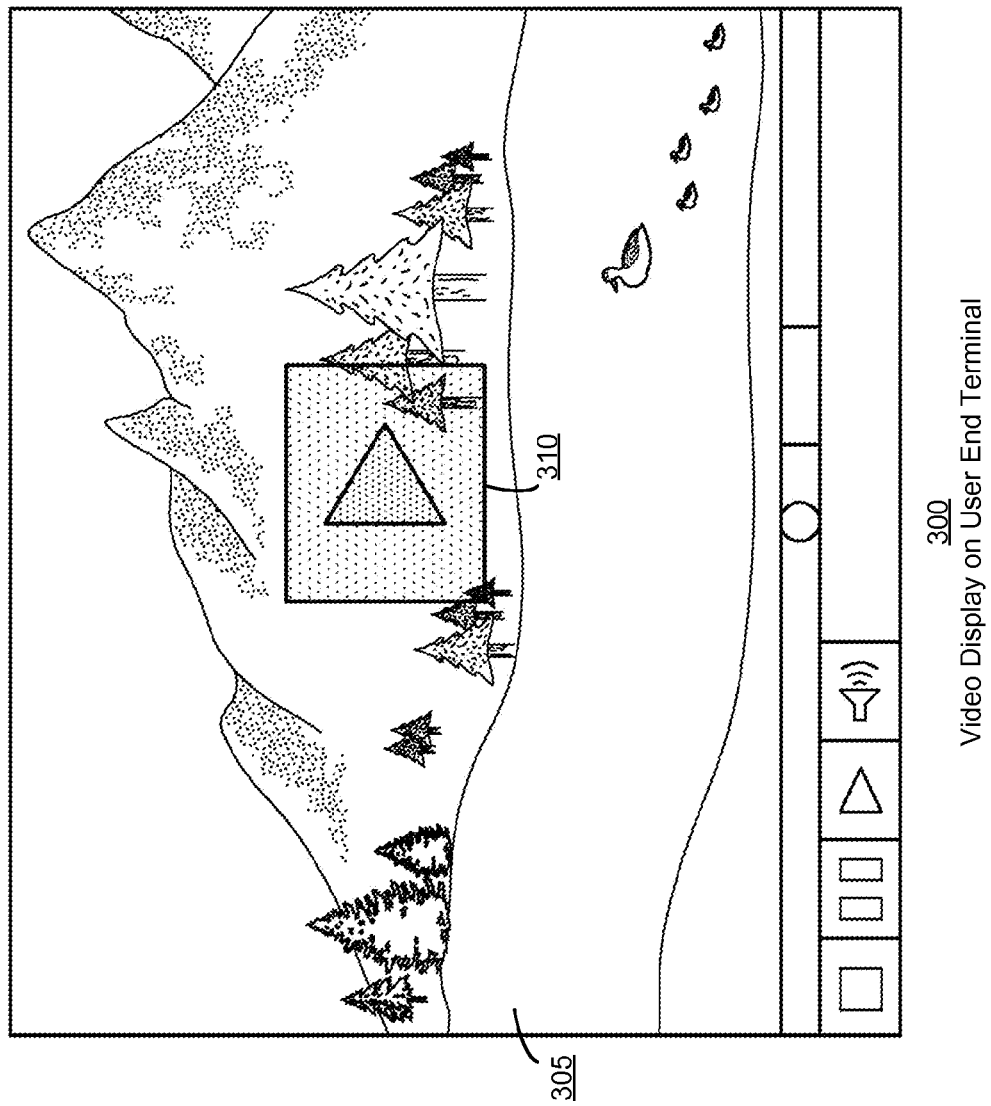
FIG. 3 depicts an example of composite video data displayed on a user end terminal.

FIG. 3 depicts an example of composite video data displayed on a user end terminal. For example, video display 300 may be an initial frame of a video presented by video player 148 that is ultimately displayed on user end terminal $215_1$. In one embodiment, video data 305 may originate from an encoded video file (e.g., MPEG-4, H.263, etc.) that is served from video server 205 or may be obtained and presented by video player 148 in any other manner (e.g., from a local file, etc.). A semi-transparent UI element, such as play button 310, is displayed over video data 305. In one embodiment, play button 310 is a graphical image described by one or more parameters, including pixel data (RGB, YUV, etc.), transparency value (alpha), time, and a location in video display 300, which is combined with video data 305 through alpha-blending techniques resulting in the component video content displayed in FIG. 3. It should be recognized that video data 305 and play button 310 are merely exemplary and that any number of transparent, semi-transparent or other graphical images or may be overlaid on top of any video data. Similarly, such overlays may be displayed at any appropriate location or time within the display window.

Figure 4:
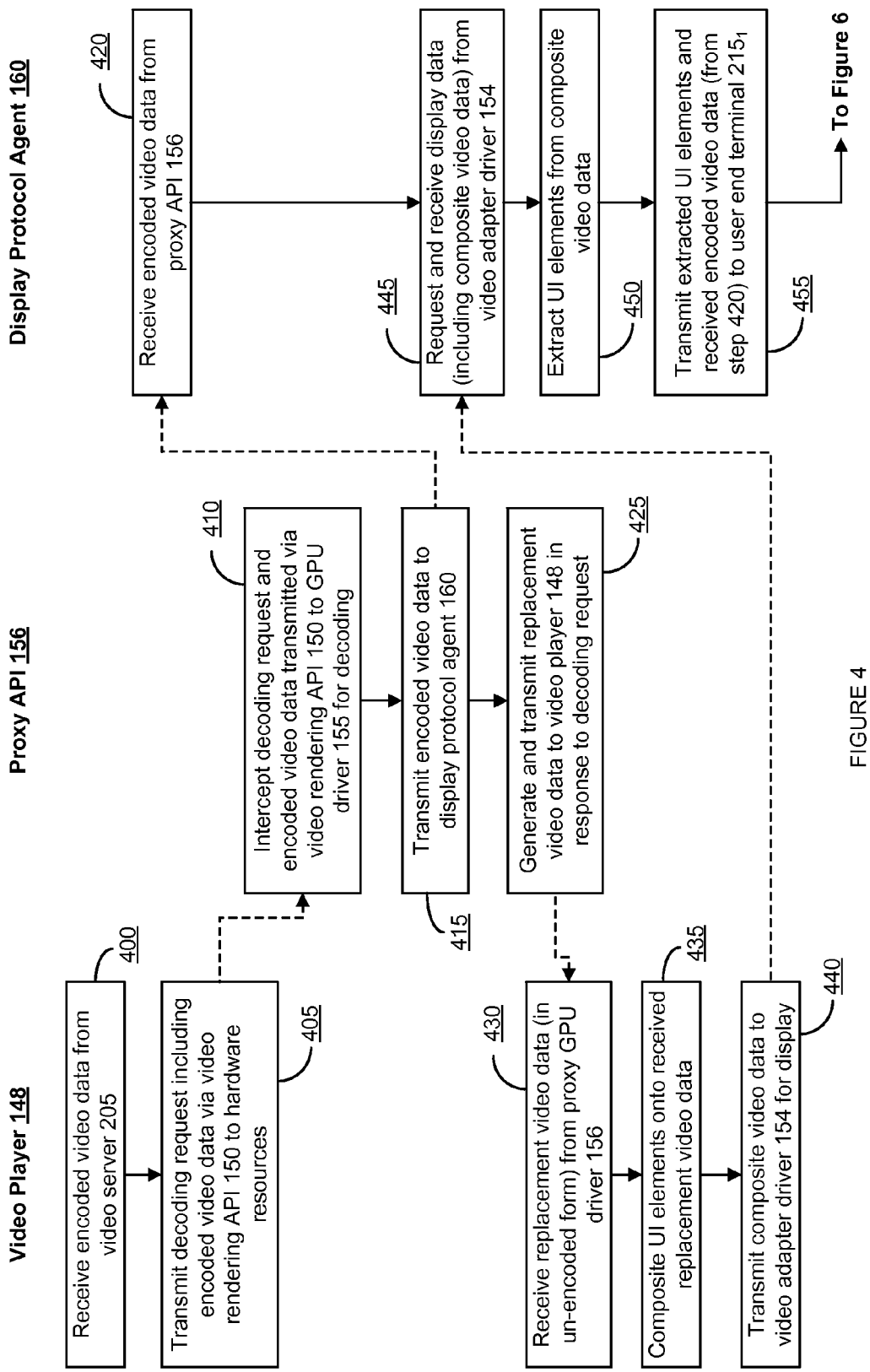
FIG. 4 depicts a flow chart for transmitting video data from a virtual desktop to an user end terminal for display.

FIG. 4 depicts a flow chart for transmitting video data from a virtual desktop to a user end terminal for display. Although the steps in FIG. 4 reference components in the remote desktop server network architecture of FIG. 1 or 2, it should be recognized that alternative embodiments of computer systems having different components that perform similar functions may implement the steps in FIG. 4 consistent with the teachings herein. In step 400, video player 148 in VM $142_1$ (e.g., a virtual desktop environment) receives, upon its request, video data from video server 205. As previously discussed, such received video data is in encoded form, such as MPEG-4 or H.263. In step 405, video player 148 transmits a decoding request, including the received encoded video data, to hardware resources for decoding via video rendering API 150 (e.g., Microsoft DirectX Video Acceleration, etc.) which assists in accessing virtual GPU 126 (and physical GPU 106) through GPU driver 154. However, in step 410, proxy API 156 intercepts the decoding request and encoded video data, and in step 415, transmits the encoded video data to display protocol agent 160, which then correspondingly receives the encoded video data in step 420. In step 425, proxy API 156, in response to the decoding request of video player 148 in step 405, generates and transmits replacement video data to video player 148 (i.e., instead of the actual decoded video data corresponding to the encoded video data received in step 400, as requested by video player 148). In one embodiment, such replacement video data comprises video frames of a known image, such as a checkerboard image. When, in step 430, video player 148 receives the replacement video data, in step 435, it composites the replacement video data with transparent or semi-transparent UI elements (or any other transparent or semi-transparent overlays) thereby generating composite video data. In one embodiment, such compositing involves alpha-blending techniques and video player 148 may again access video rendering API 150 to request graphics hardware assistance in performing such alpha-blending (in which case, proxy API 156, rather than intercepting the request as in step 410, may forward such alpha-blending related requests to video rendering API 150).

Figure 5A:
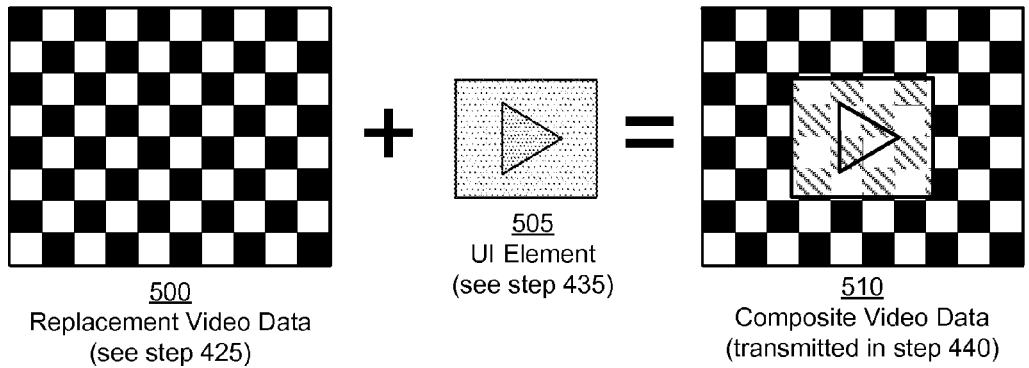
FIG. 5A depicts an example of compositing replacement video data and user interface elements.

FIG. 5A depicts an example of compositing replacement video data and user interface elements, for example, as performed by video player 148 in step 435. In one embodiment, such compositing is performed by video player 148. Replacement video data 500 represents a checkerboard image for a video frame that is, for example, transmitted by proxy API 156 to video player 148 in step 425. Such replacement video data may be, for example, generated by proxy API 156 with the assistance of graphics hardware support (e.g., GPU) in VM $142_1$ or otherwise accessed from local memory or storage. In one embodiment, virtual GPU 126 is modified or otherwise configured to generate such replacement video data upon a request from proxy API 156. Play button 505 represents a semi-transparent UI element that is composited (e.g., via alpha-blending techniques) on top of replacement video data 500 by video player 148 in step 435 to produce composite video data 510.

Figure 5B:
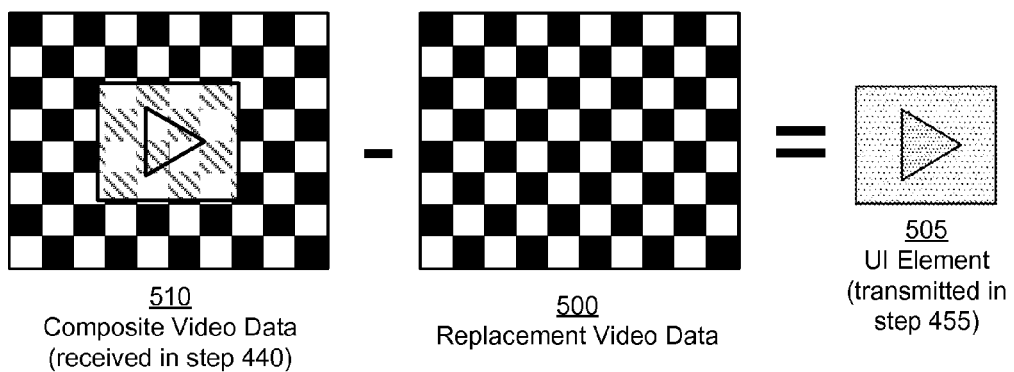
FIG. 5B depicts an example of extracting user interface elements from composite video data.

Returning to FIG. 4, in step 440, video player 148 transmits the composite video data to video adapter driver 154 for display. In step 445, display protocol agent 160 requests or otherwise receives display data (which includes the composite video data) from video adapter driver 154 and in step 450, extracts the UI elements from the composite video data (e.g., by subtracting the replacement video data from the composite image). In one embodiment, display protocol agent 160 also utilizes graphics hardware support (e.g. GPU) in performing such extraction. FIG. 5B depicts an example of extracting user interface elements from composite video data, for example, as performed by display protocol agent 160 in step 450. Replacement video data 500 is generated or otherwise accessed (e.g., retrieved from memory or storage) by display protocol agent 160 and subtracted from composite video data 510 (i.e., received by display protocol agent 160 from video adapter driver 158 in step 445), thereby resulting in UI element 505.

Returning to FIG. 4, in step 455, display protocol agent 160 then transmits the encoded video data (e.g., MPEG-4, H.263, etc.) received in step 420 as well as the UI elements extracted in step 450 to user end terminal $215_1$. It should be recognized that the various components performing actions and receiving data and instructions in FIG. 4 are merely exemplary and that alternative embodiments may distribute functionality and transmit data to different components. For example, in one alternative embodiment, proxy API 156 may transmit the encoded video data in step 440 to a video adapter driver that is modified or configured to receive such encoded video data rather than transmitting such encoded video data to display protocol agent 160. Similarly, rather than receiving encoded video data from video server 205 in step 400, video player 148 may alternatively play encoded video data stored as a local file.

Figure 5C:
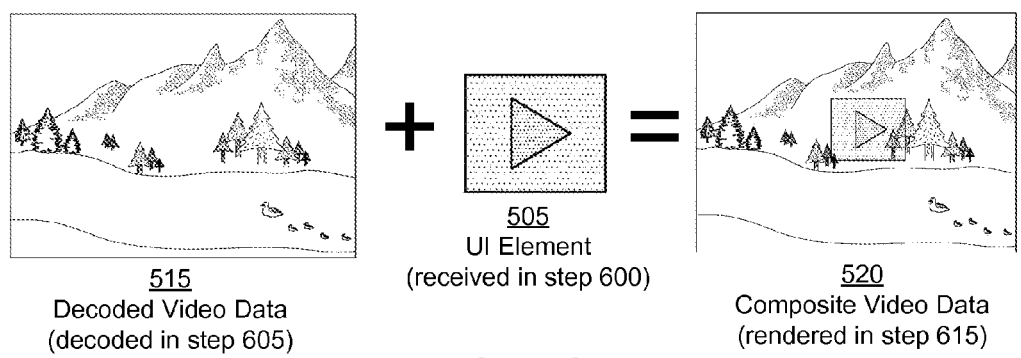
FIG. 5C depicts an example of compositing decoded video data and user interface elements.
Figure 6:
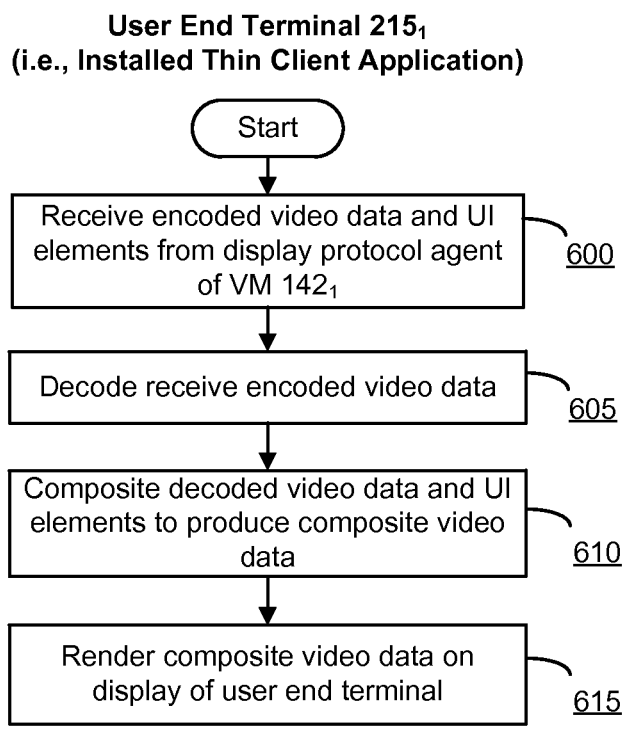
FIG. 6 depicts a flow chart for rendering video data received from a virtual desktop at an user end terminal.

FIG. 6 depicts a flow chart for rendering video data received from a virtual desktop at an user end terminal. In one embodiment, a thin client application is installed in user end terminal $215_1$ that is capable of decoding encoded video data as well as performing compositing techniques such as alpha-blending. If user end terminal $215_1$ further includes graphics hardware (e.g., GPUs) to accelerate graphics processing and rendering, embodiments of the thin client application may also utilize such graphics hardware when decoding and/or rendering video. In step 600, the thin client application installed on user end terminal $215_1$ receives the encoded video data and UI elements from display protocol agent 160 (i.e., from step 455). In step 605, the thin client application decodes the received encoded video data and in step 610 composites the UI elements into the decoded video data, for example, using alpha-blending techniques. In one embodiment, if graphics hardware is available on user end terminal $215_1$, then the thin client application utilizes such graphics hardware to assist in performing steps 605 and/or 610. In step 615, the thin client application renders the composite video data on the display of user end terminal $215_1$. FIG. 5C depicts an example of compositing decoded video data and user interface elements at a user end terminal. Video data 515 is decoded in step 605 and UI element 510, which was received in step 600 is alpha-blended with decoded video data 515 in step 610 producing composite video data 520, which is displayed in step 615.

Although one or more embodiments herein have been described in some detail for clarity of understanding, it should be recognized that certain changes and modifications may be made consistent with the teachings herein. For example, although FIG. 1 depicts an embodiment in which display protocol agent 160 executes within VM $142_1$, it should be recognized that alternative embodiments may implement display protocol agent 160 in other components of remote desktop server 100, for example, as a driver within guest OS 144 or within the virtual machine monitor $170_1$ or elsewhere in hypervisor 120. Similarly, although FIG. 1 depicts an embodiment in which display protocol agent 160 and video adapter driver 158 run in a virtual machine $142_1$ that communicates with a virtual video adapter 134 in a hypervisor 120, it should be recognized that these components may be deployed in any remote desktop server architecture, including non-virtual machine based computing architectures. Additionally, it should be recognized that the functionality of video adapter driver 158 as described herein (e.g., transmitting composite video data to display protocol agent 160 in step 420) can be implemented in a separate extension or component to a pre-existing or standard video adapter driver (i.e., display protocol agent 160 may communicate with such a separate extension to the video adapter driver rather than the pre-existing video adapter driver itself).

It should further be recognized that certain functions that have been described as being performed within VM $142_1$ may be performed at user end terminal $215_1$ in alternative embodiments, to the extent, for example, performance of such functions by user end terminal $215_1$ alleviates computing resource pressure on remote desktop server 100. For example, in an alternative embodiment, rather than extracting UI elements from composite replacement video data in step 450 in VM $142_1$, the composite replacement video data (e.g., checkerboard image composited with UI elements) and the replacement video data itself (e.g., checkerboard image, etc.) is transmitted to end user terminal $215_1$ along with the encoded video data in step 455. In such an embodiment, the thin client application installed on user end terminal $215_1$ extracts the UI elements from the composite replacement video data (by subtracting the replacement video data from the composite replacement video data) and then composites the resulting extracted UI elements with decoded video data, as in step 610 of FIG. 6.

Additionally, although the foregoing embodiments discuss composite video data in reference to actual video data that has been combined with transparent or semi-transparent UI elements, it should be recognized that the steps of compositing discussed herein may relate to any type of visual elements or overlays (i.e., UI related or otherwise), such as additional streaming data (e.g., subtitles, etc.), and embedded displayed metadata (e.g., markers, frame numbers, indices, etc.) and the like. It should further be recognized that although the foregoing embodiments herein have utilized a static play button displayed in a first video frame of a video as an example UI element, any additional elements displayed over video data at any time to produce composite video data may be utilized consistent with the teachings herein, whether such elements are static images that do not change frame-to-frame as they are overlaid on the video or whether such elements are dynamic, such as video player controls that dynamically appear (and correspondingly disappear) when a user moves a mouse over the video display (or otherwise touches the video display) or other video clips that change between frames, either synchronously or asynchronously with the video content.

Similarly, although FIGS. 5A-5B depict a certain embodiment of a checkerboard image as replacement video data, it should be recognized that alternative embodiments may employ alternative and/or additional techniques to generate known images or video data to serve as replacement video data that facilitates the extraction of UI elements that may be composited with such replacement video data. In certain embodiments, in order to adequately extract the color values (e.g., RGB or YUV values) as well as transparency values (alpha values) of UI elements from composite replacement video data that includes both replacement video data (e.g., known images) and the UI elements themselves (e.g., as in step 450), it is insufficient to merely subtract or otherwise remove the color values of the pixels of the known image from the composite replacement video data, since the values resulting from such subtraction or removal can represent any of a number of combinations of color and transparency values for each pixel of the UI elements. In order to obtain additional information to assist in the extraction of UI elements from composite replacement video data, one embodiment utilizes a finely granular checkerboard image as the known image, wherein each adjacent pixel in the known image is either white or black (or any other different solid colors). Each known image for the previous and subsequent video frame is further alternated, such that a previously black pixel in a known image for a current video frame is switched to a white pixel in the previous and next video frame. Such an embodiment enables the UI elements extraction process (e.g., step 450) to analyze and compare both adjacent pixels (i.e., spatial analysis) as well as the same pixel across time (i.e., temporal analysis) in order to determine or otherwise more accurately estimate color and transparency pixel values for the UI elements. Alternative embodiments may generate known images for replacement video data based only for spatial analysis or temporal analysis rather than both.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. In general, aspects of the one or more embodiments described herein may be implemented on one or more computers executing software instructions.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for offloading decoding of encoded video data from a computer system executing a video player application to a remote display terminal, the method comprising:
    intercepting a video decoding function call from the video player application requesting graphics hardware assistance from the computer system to decode the encoded video data, wherein the video player application is configured to decode encoded video data and composite graphical overlays onto decoded video data;
    providing replacement video data to the video player application rather than a decoded version of the encoded video data in response to the video decoding function call;
    receiving, by the computer system, composite video data composited by the video player application, wherein the composite video data comprises the provided replacement video data and a graphical overlay;
    extracting, by the computer system, the graphical overlay from the received composite video data by subtracting the replacement video data from the composite video data; and
    transmitting the encoded video data and the extracted graphical overlay from the computer system to the remote display terminal, wherein the remote display terminal decodes the encoded video data and composites the graphical overlay onto the decoded video data to generate a final composite video data for display.

2. The method of claim 1, wherein the video player application executes within a virtual machine and the remote display terminal receives graphical user interface displays from the virtual machine.

3. The method of claim 2, wherein the replacement video data is generated with the assistance of a virtual GPU.

4. The method of claim 2, wherein the receiving, extracting and transmitting steps are performed by a display protocol application running in the virtual machine and wherein the display protocol application is configured to transmit displays of the virtual machine to the remote display terminal in accordance with a display protocol.

5. The method of claim 4, wherein the composite video data composited by the video player application is transmitted by the video player application to a video adapter driver that is configured to transmit the composite video data to the display protocol application.

6. The method of claim 1, wherein the intercepting step is performed by a proxy library configured to intercept function calls transmitted to a pre-existing video rendering library.

7. The method of claim 1, wherein each video frame in the replacement video data comprises a graphical image, wherein each adjacent pixel of the graphical image alternates between one of two colors and each corresponding pixel in a prior graphical image of an immediately prior video frame in the replacement video data is the other of the two colors.

8. The method of claim 1, wherein pixels of the graphical overlay comprise alpha transparency values.

9. A computer system configured to offload decoding of encoded video data from a video player application on the computer system to a remote display terminal, the computer system comprising a processor configured to perform the steps of:
    intercepting a video decoding function call from the video player application requesting graphics hardware assistance from the computer system to decode the encoded video data, wherein the video player application is configured to decode encoded video data and composite graphical overlays onto decoded video data;
    providing replacement video data to the video player application rather than a decoded version of the encoded video data in response to the video decoding function call;
    receiving, by the computer system, composite video data composited by the video player application, wherein the composite video data comprises the provided replacement video data and a graphical overlay;
    extracting, by the computer system, the graphical overlay from the received composite video data by subtracting the replacement video data from the composite video data; and
    transmitting the encoded video data and the extracted graphical overlay from the computer system to the remote display terminal, wherein the remote display terminal decodes the encoded video data and composites the graphical overlay onto the decoded video data to generate a final composite video data for display.

10. The computer system of claim 9, wherein the video player application executes within a virtual machine on the computer system and the remote display terminal receives graphical user interface displays from the virtual machine.

11. The computer system of claim 10, wherein the replacement video data is generated with the assistance of a virtual GPU.

12. The computer system of claim 10, wherein the receiving, extracting and transmitting steps are performed by a display protocol application running in the virtual machine and wherein the display protocol application is configured to transmit displays of the virtual machine to the remote display terminal in accordance with a display protocol.

13. The computer system of claim 12, wherein the composite video data composited by the video player application is transmitted by the video player application to a video adapter driver that is configured to transmit the composite video data to the display protocol application.

14. The computer system of claim 9, wherein the intercepting step is performed by a proxy library configured to intercept function calls transmitted to a pre-existing video rendering library.

15. The computer system of claim 9, wherein each video frame in the replacement video data comprises a graphical image, wherein each adjacent pixel of the graphical image alternates between one of two colors and each corresponding pixel in a prior graphical image of an immediately prior video frame in the replacement video data is the other of the two colors.

16. A non-transitory computer readable storage medium including instruction that, when executed by a processor of a computer system, offloads decoding of encoded video data from a computer system to a remote display terminal, by performing the steps of:

intercepting a video decoding function call from the video player application requesting graphics hardware assistance from the computer system to decode the encoded video data, wherein the video player application is configured to decode encoded video data and composite graphical overlays onto decoded video data;

providing replacement video data to the video player application rather than a decoded version of the encoded video data in response to the video decoding function call;

receiving, by the computer system, composite video data composited by the video player application, wherein the composite video data comprises the provided replacement video data and a graphical overlay;

extracting, by the computer system, the graphical overlay from the received composite video data by subtracting the replacement video data from the composite video data; and transmitting the encoded video data and the extracted graphical overlay from the computer system to the remote display terminal, wherein the remote display terminal decodes the encoded video data and composites the graphical overlay onto the decoded video data to generate a final composite video data for display.

17. The non-transitory computer-readable storage medium of claim 16, wherein the video player application executes within a virtual machine and the remote display terminal receives graphical user interface displays from the virtual machine.

18. The non-transitory computer-readable storage medium of claim 17, wherein the receiving, extracting and transmitting steps are performed by a display protocol application running in the virtual machine and wherein the display protocol application is configured to transmit displays of the virtual machine to the remote display terminal in accordance with a display protocol.

19. The non-transitory computer-readable storage medium of claim 18, wherein the composite video data composited by the video player application is transmitted by the video player application to a video adapter driver that is configured to transmit the composite video data to the display protocol application.

20. The non-transitory computer-readable storage medium of claim 16, wherein the intercepting step is performed by a proxy library configured to intercept function calls transmitted to a pre-existing video rendering library.

21. The non-transitory computer-readable storage medium of claim 16, wherein each video frame in the replacement video data comprises a graphical image, wherein each adjacent pixel of the graphical image alternates between one of two colors and each corresponding pixel in a prior graphical image of an immediately prior video frame in the replacement video data is the other of the two colors.

* * * * *